United States Patent [19]
Wilda et al.

[11] Patent Number: 5,765,436
[45] Date of Patent: Jun. 16, 1998

[54] METER BODY FOR PRESSURE TRANSMITTER

[76] Inventors: Douglas W. Wilda, 2100 Grant Mews; James V. Davidson, 336 Casals Pl., both of Ambler, Pa. 19002

[21] Appl. No.: 862,663

[22] Filed: May 23, 1997

[51] Int. Cl.⁶ .................................................. G01L 7/00
[52] U.S. Cl. .................................................. 73/706
[58] Field of Search .................................. 73/706, 756

[56] References Cited

U.S. PATENT DOCUMENTS

| | | | |
|---|---|---|---|
| 2,216,374 | 10/1940 | Martin | 73/706 |
| 4,041,761 | 8/1977 | Lonti | 73/706 |
| 4,077,261 | 3/1978 | Ring et al. | 73/706 |
| 4,283,954 | 8/1981 | Echtler et al. | 73/706 |
| 5,652,391 | 7/1997 | Kingsford et al. | 73/706 |

*Primary Examiner*—Robert Raevis
*Attorney, Agent, or Firm*—Robert J. Black; Anthony Miologos

[57] ABSTRACT

A meter body for use in a pressure transmitter in a continuous pressurized transmission system. The meter body is cylindrical in form with a bottom end (including a flexible diaphragm) adapted to engage a flexible gasket to form a so-called "sanitary-seal" connection. The top end is configured to be connected to a sensor capsule.

7 Claims, 7 Drawing Sheets

// 1

METER BODY FOR PRESSURE TRANSMITTER

BACKGROUND OF THE INVENTION

1. Field of the Invention

The present invention relates to continuous pressurized transmission systems. More particularly, the present system relates to meter body construction as utilized in a pressure transmitter for providing pressure information from an associated piping system.

2. Background Art

The present invention overcomes some of the problems inherent in prior meter bodies associated with transducer equipment manufactured by the assignee of the instant application. As can be see in prior art FIG. 3, a flange mount solution has been employed to provide a meter body connection. This unit is particularly difficult to interface with an associated characterization system. The characterization system being utilized for initializing or establishing the parameters for operation of the connected meter. This is particularly true inasmuch as the extended tube seen in FIG. 3 is extremely bulky and difficult to handle. Accordingly, a characterization system unique only to that design is required. A remote seal element as shown in prior art FIG. 4 is a custom design adapted to specific customer requirements. Accordingly, it is costly to manufacture and provides a great degree of difficulty in providing an appropriate interface to a characterization system.

A search of the background art directed to the subject matter of the present invention conducted in the U.S. Patent and Trademark Office disclosed the following U.S. Letters Patent:

| | |
|---|---|
| 3,836,183 | 4,896,902 |
| 4,355,828 | 5,058,928 |
| 4,372,587 | 5,366,263 |
| 4,620,731 | 5,401,062 |
| 4,787,654 | 5,437,482 |

A thorough review of the above-identified patents has concluded that none are believed to claim, teach, or disclose the novel combination of elements and functions set forth in the present invention.

Accordingly, it is the object of the present invention to provide an improvement in the manufacture of a pressure transmitter which interfaces to a variety of customer connections by building a meter body as a base module including the industry standard quick disconnect "sanitary-seal" configuration. Of particular significance in the present invention is that feature relating to the utilization of an interface to a characterization system that is both simple and economical. Another feature of the present invention is its modular construction. Because of the latter only a single module need be constructed to satisfy numerous customer applications, particularly inasmuch as the meter body of the transmitter provides the necessary sanitary-seal type connection.

SUMMARY OF THE INVENTION

The present invention achieves the above objects and features by providing a design that is readily adaptable to a number of different type of connections. By means of an extended flange-like base, the meter body can readily be connected to a number of different adapter units, all of which include a tapered surface configured to receive the flange-like base extension on the meter body. The top portion of the meter body provides a location for connection to a sensor capsule which receives pressurized fluid from a centrally located bore running vertically through the meter body. Also included in the meter body are additional bores for venting the meter body to the atmosphere and a bore adapted for filling the interior of the meter body with liquid. The bore of the meter body is connected at its bottom end to a diaphragm which when connected to an associated pipe or transmission system responds to the pressure of the media contained within the piping system.

Of major importance, at the bottom end of the meter body is the inclusion of the "sanitary-seal" arrangement. This configuration is recognized as an industry standard and provides satisfactory connection to a large variety of associated piping systems as will be described hereinafter.

BRIEF DESCRIPTION OF THE DRAWINGS

Preferred embodiments of the present invention will be described in detail with reference to the accompanying drawings wherein.

DETAILED DESCRIPTION OF THE PREFERRED EMBODIMENT

Figure 1:
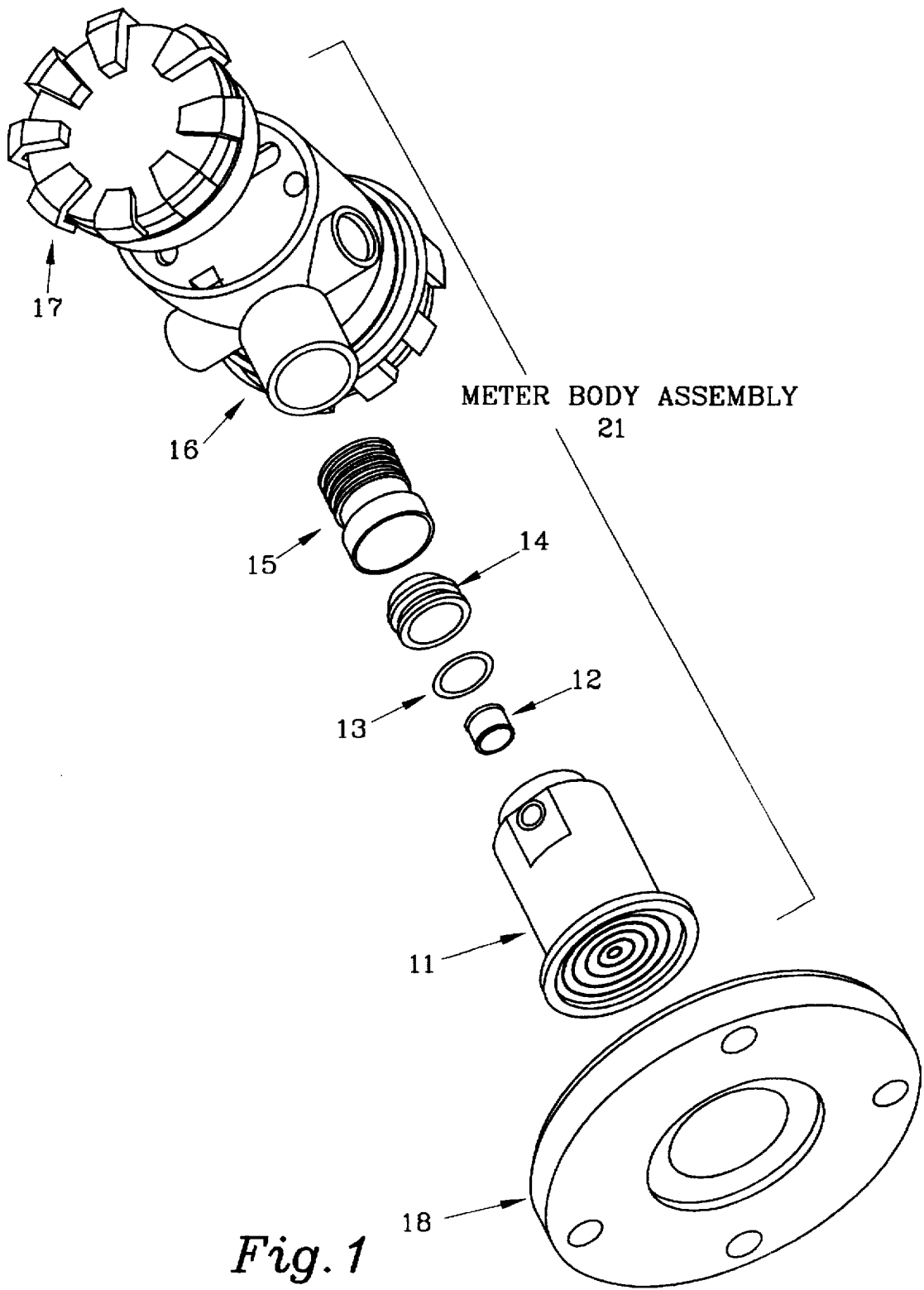
FIG. 1 is an exploded view of a meter body assembly including the meter body of the present invention.

Referring first to FIG. 1, a meter body assembly 21 is shown utilizing a meter body 11 in accordance with the present invention. The assembly 21 includes a meter body 11, a sensor capsule 12, "O" ring 13, sensor cover 14, a housing interface 15, and the electronics circuitry housing 16 with an end cap housing 17 shown removed. The assembly can be utilized with a process adapter flange 18, as shown.

Figure 2:
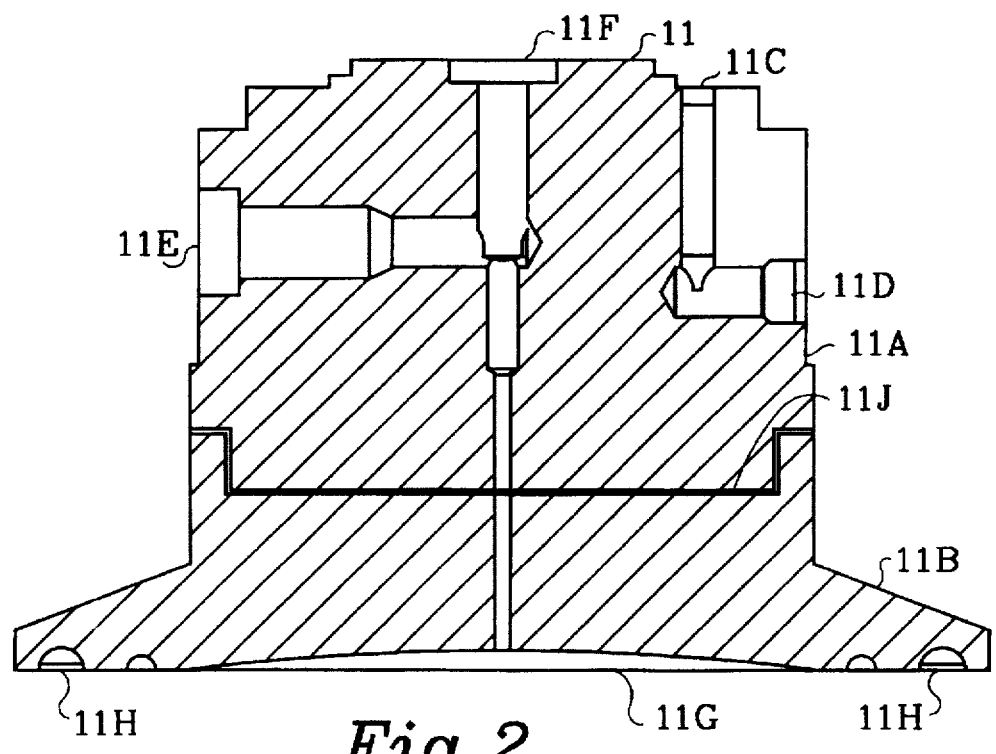
FIG. 2 is a cross-sectional view of a meter body in accordance with the teachings of the present invention.
Figure 3:
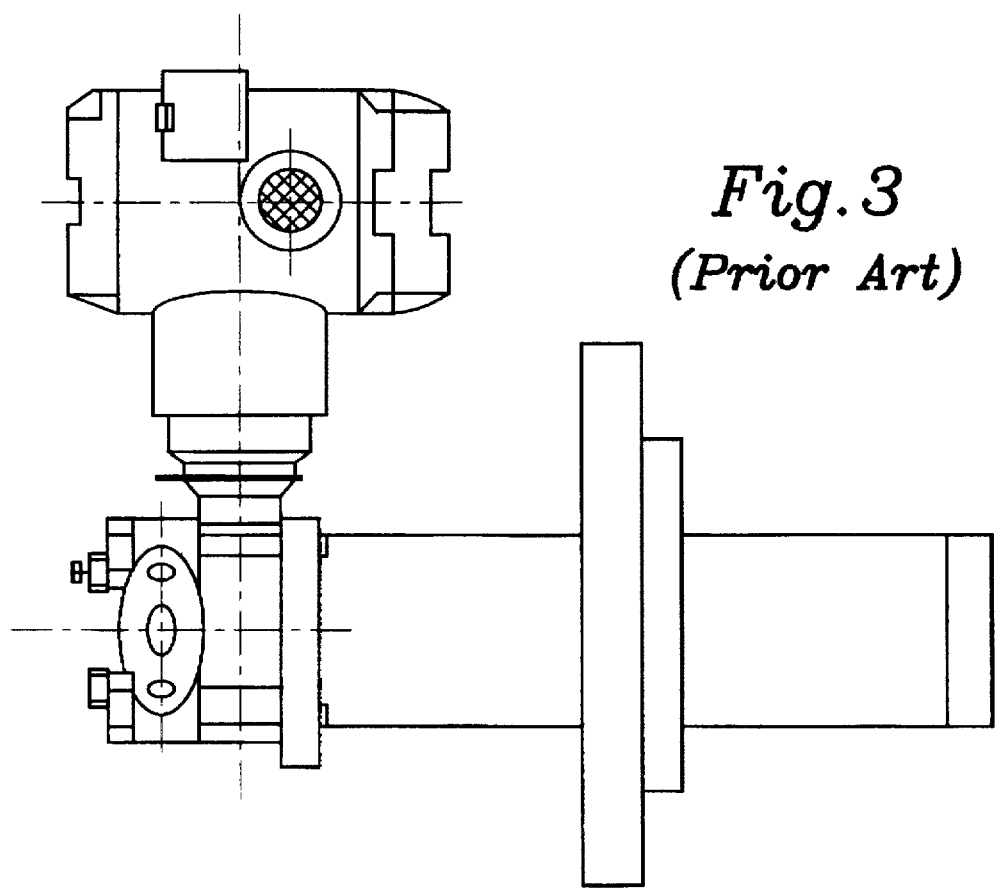
FIG. 3 is a prior art solution to the problem solved by the present invention utilizing a flange-mount solution with an extended bulky tube.
Figure 4:
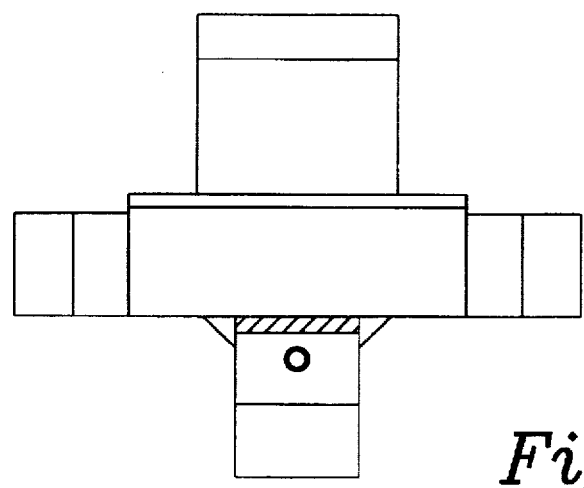
FIG. 4 is a custom made prior art remote seal.

As will be obvious from reference to FIG. 2, the meter body tapered portion extends downwardly and radially from the cylindrical sidewalls to form a flange-like base such as 11B shown in FIG. 2. Referring now to the cross-sectional view again of FIG. 2, the meter body includes at its bottom end diaphragm 11G connected to vertical channel or bore 11F. At the bottom edge of meter body 11 there is included an annular recessed ring, such as 11H (semi-circular in cross section), which is utilized in engaging the projections on an industry standard type of sanitary-seal gasket which facilitates the ready assembly and disassembly from a piping system or an associated characterization or initialization system.

The meter body further includes a channel 11E which extends to vertical channel 11F which is utilized for insertion of fluid within the housing after which a plug is inserted into the opening 11E. This operation takes place after the unit has been assembled to a sensor capsule, such as 12, to form the rest of meter body assembly 21. Openings 11D and 11C as shown in FIG. 2 provide for atmospheric venting.

Line 11J across the meter body is present to indicate an alternate body construction wherein meter body 11 is divided into two sections, 11A and 11B, each constructed of a different material, subsequently being joined for later usage.

It should be noted in referring to FIG. 1, that within the housing section 16, connected to the sensor capsule, is the necessary electronic circuitry responsive to pressure variations detected at the meter body to provide the necessary detailed information about pressure conditions determined by the present meter body assembly. Electronics include transmitter memory function performed by an EEPROM and A/D conversion circuitry which is integral to the sensor assembly.

Initially, the unit will be connected to a characterization system for initialization or standards establishment. The characterization system is connected in a manner similar to that shown in FIG. 8., provides known reference conditions to the unit so that its performance can be mapped over a full range of operating conditions. Data collected during characterization is subsequently utilized by the transmitter software to provide a corrected output. The present unit facilitates the task of physically interfacing the meter body assembly, such as 21, to the characterization system which normally in the past has been a time-consuming, costly operation. This operation is facilitated by the utilization of the sanitary-seal configuration on meter body 11.

Referring again to FIG. 2, it should be noted that the tapered shape of the sanitary-seal connection provides self-centering to an associated slip-on flange, such as 18, and also to any other seal ring relative to the transducer. It is believed to be obvious from the foregoing that the meter body 21 in accordance with the present invention has a base module 11 including an industry standard quick disconnect sanitary-seal configuration that facilitates interfacing the meter body to a factory characterization system and also facilitating connection to other customer interfaces with readily manufacturable hardware. Utilization of a single module as taught by the present invention facilitates its utilization with many customer applications wherein the base transducer can effectively provide the traditional sanitary seal type of connection.

Figure 5:
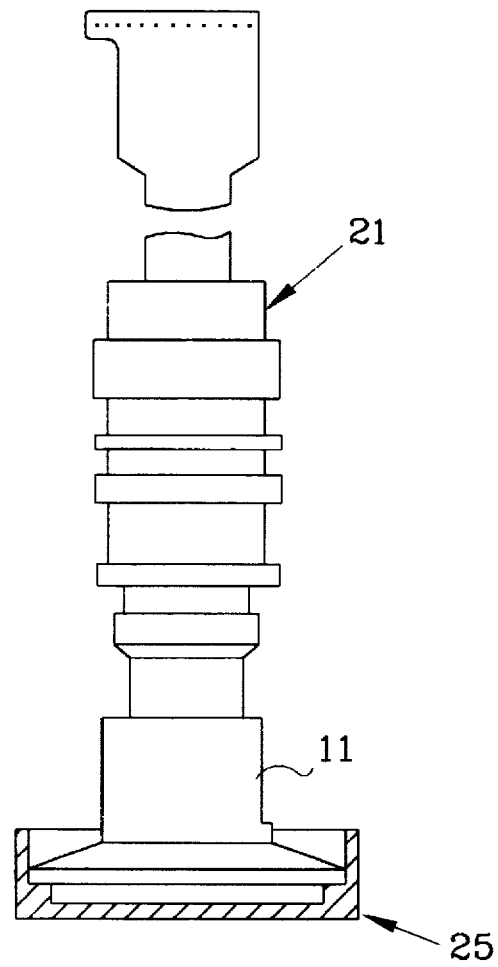
FIG. 5 is a partially sectionalized view showing application of the meter body of the present invention utilized in connection with a sanitary-seal.

The utilization of the meter body assembly 21 including a meter body, such as 11, in accordance with the present invention, is shown in FIGS. 5–10. In FIG. 5, meter body 11 is shown connected to a sanitary-seal configuration with a protective cover and flange mount 25.

Figure 6:
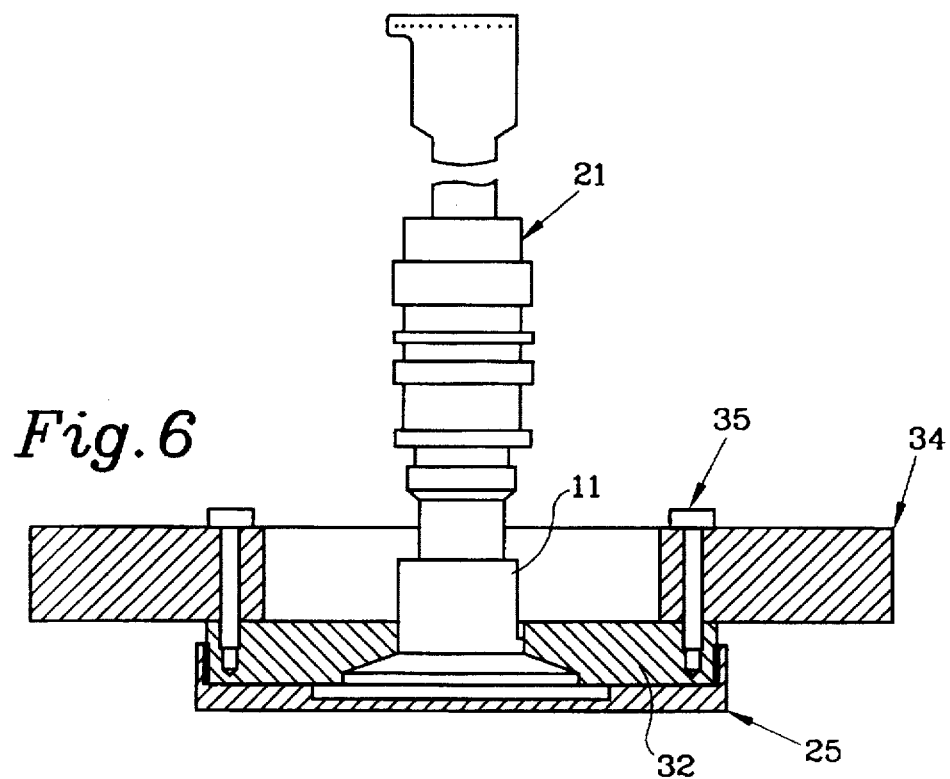
FIG. 6 is a partially sectionalized view showing a meter body of the present invention as utilized with a flush flange.

In FIG. 6, meter body 11 is shown employed with a flush flange 34, cover 25 and gasket ring 32, secured by cap screw 35.

Figure 7:
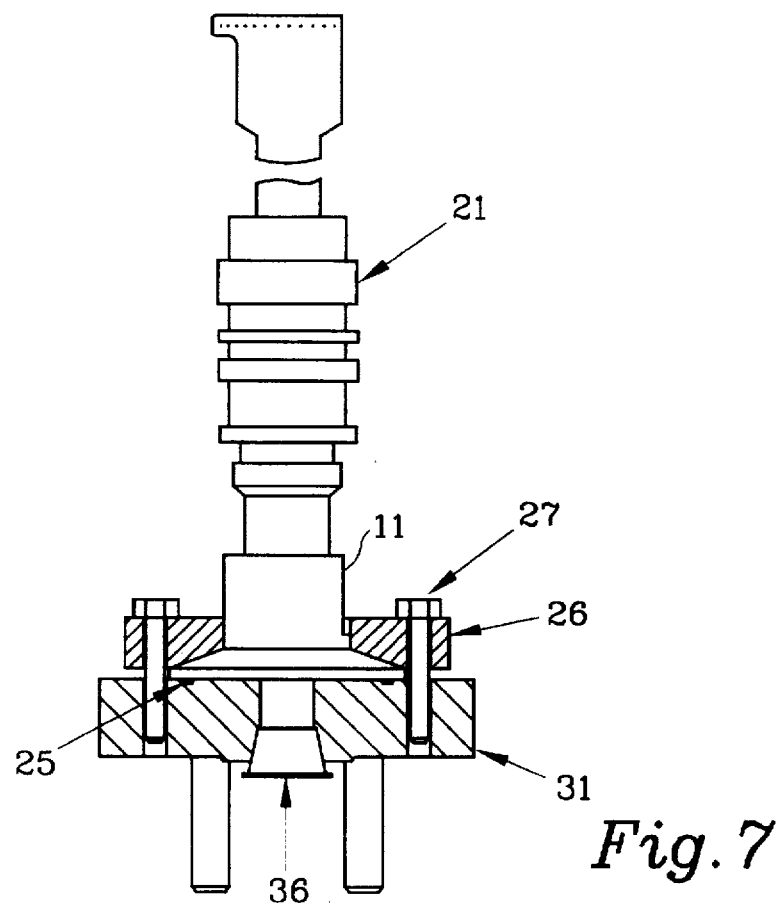
FIG. 7 is a partially sectionalized view showing a meter body in accordance with the present invention in connection with a small flange.

In FIG. 7, meter body is positioned by clamp 26 to flange mount 31 where it is held in place by means of screws 27 and includes an O-ring for the flange mount such as 25. A cap plug 36 is shown at the bottom.

Figure 8:
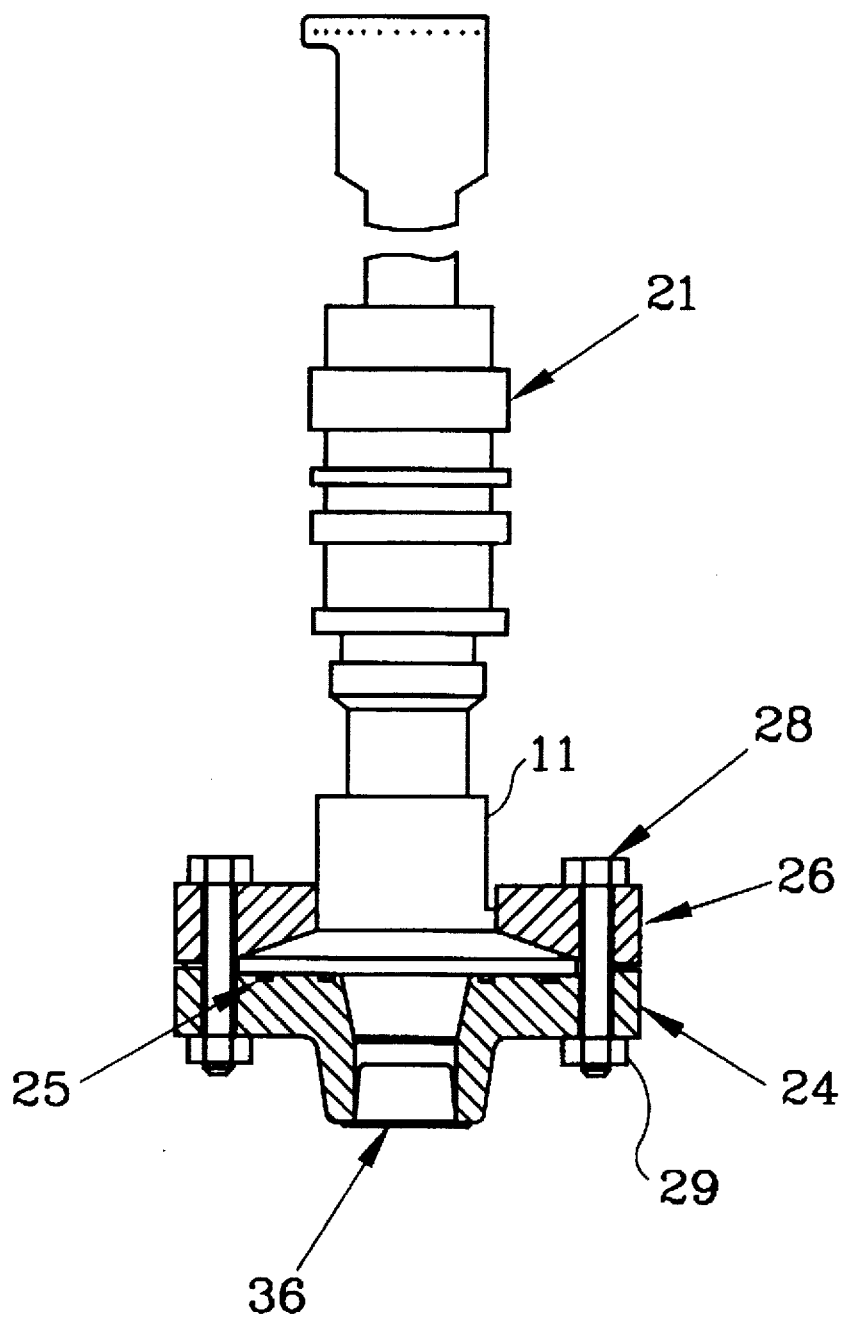
FIG. 8 is a partially sectionalized view showing a meter body in accordance with the present invention utilized in connection with a GP/1 head.

FIG. 8 shows the utilization of meter body 11 with a GP/1 head and clamp, such as 26, secured to a GP/1 head, such as 24, by hex head bolts 28, secured by nuts 29. Again, cap plug 36 is employed at the bottom of the GP/1 head.

Figure 9:
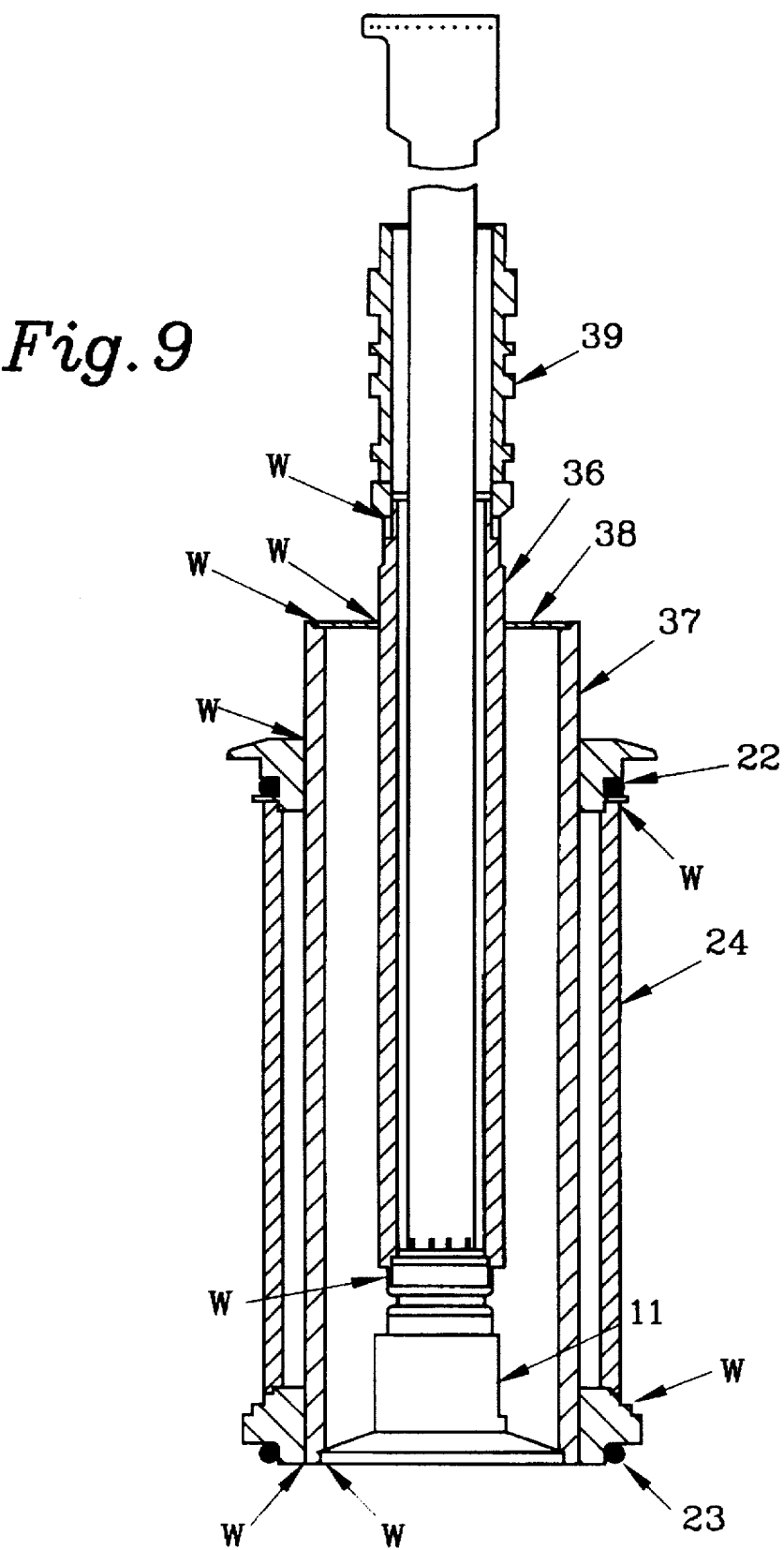
FIG. 9 is a partially sectionalized view showing a meter body in connection with an extended sanitary seal.

FIG. 9 shows an extended sanitary-seal comprising meter body 11 providing connections to adapter 39 and an extender support plate 38, extension tube 37, an extender sensor cover 36. Also utilized are "O" rings 22 and 23, and a sanitary-seal extension flange assembly 24. Also noted that at points W extending along the periphery of the assembly are locations for welds to be applied.

Figure 10:
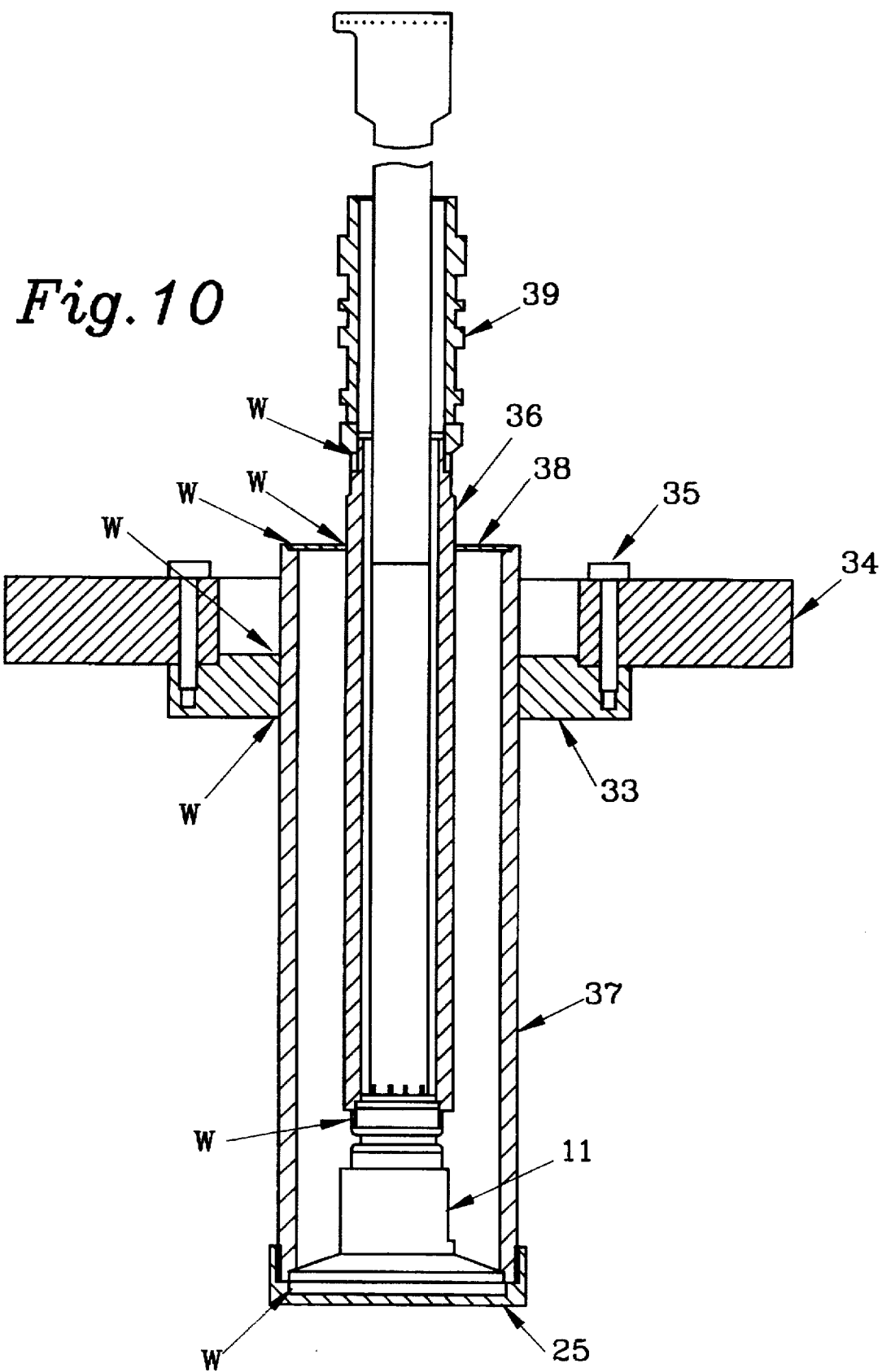
FIG. 10 is a partially sectionalized view showing the application of a meter body in accordance with the present invention in connection with the utilization of an extended flange.

FIG. 10 shows the utilization of meter body 11 along with an extended flange arrangement comprising protector cover 25 with a flange mount, adaptor 39, extender support plate 38, extension tube 37, extender sensor cover 36, screw 35, flange mount 34, gas and ring for the flange mount 33. Also note that at points W extending along the periphery of the assembly are locations for welds to be applied.

From the foregoing it will be obvious that many applications are easily facilitated by utilization of the meter body of the present invention as utilized in a meter body assembly as shown herein. One such assembly has been described previously wherein a unique flange configuration required to complete a customer's requirement can be manufactured in the transducer body and the flange joined by welding, the perimeter of the transducer body to the flange. This facilitates the reduction of the production time by a substantial amount. While essentially only a single embodiment of the present invention has been shown, it will be obvious to those skilled in the art that numerous modifications may be made without departing from the present invention, which shall be limited only by the scope of the claims appended hereto.

What is claimed is:

1. A meter body for use in a pressure transmitter as utilized in a continuous pressurized transmission system, said body comprising:

a cylinder including a top portion;

a bottom portion;

and a continuous sidewall between said top and bottom portions;

a base section extending from a lower end of said cylinder, extending radially outward and including a taper toward said bottom portion;

a vertical bore extending centrally through said cylinder;

a flexible diaphragm secured to the bottom portion of said base section;

said top portion including an upper end of said bore adapted to engage a sensor capsule;

said bottom portion including at least one annular ring shaped groove having a half-circular configuration adapted to receive a flexible gasket having at least one annular rib of semi-circular cross section shaped to engage said groove;

said meter body further including first and second atmospheric venting bores including a first bore extending vertically in a downward direction from said top portion and a second sealable bore extending from said sidewall to said first vertical atmospheric venting bore.

2. A meter body as claimed in claim 1 wherein:

said meter body further includes a liquid filling bore extending through said sidewall to said central vertical bore.

3. A meter body as claimed in claim 2 wherein:

said liquid filling bore is sealable after liquid has been inserted into said meter body.

4. A meter body as claimed in claim 1 wherein:

said body further includes a top section joinable to a bottom section.

5. A meter body as claimed in claim 4 wherein:

said top section is constructed of a first material, and said bottom section is constructed of a different material.

6. A meter body as claimed in claim 1 wherein:

said bottom portion is adapted to engage a characterization system.

7. A meter body as claimed in claim 1 wherein:

said bottom portion is adapted to be connected to a selected one of a plurality of different continuous pressurized transmission system connections.

* * * * *